United States Patent [19]

Haaf et al.

[11] 4,373,055

[45] Feb. 8, 1983

[54] IMPACT RESISTANT POLYPHENYLENE ETHER RESIN COMPOSITIONS CONTAINING RADIAL TELEBLOCK COPOLYMERS

[75] Inventors: William R. Haaf, Voorhesville; Arthur Katchman, Delmar; Gim F. Lee, Jr., Albany, all of N.Y.

[73] Assignee: General Electric Company, Pittsfield, Mass.

[21] Appl. No.: 172,265

[22] Filed: Jul. 25, 1980

Related U.S. Application Data

[63] Continuation of Ser. No. 21,951, Mar. 19, 1979, abandoned, which is a continuation of Ser. No. 794,255, May 5, 1977, abandoned, which is a continuation of Ser. No. 671,344, Mar. 29, 1976, abandoned.

[51] Int. Cl.$^3$ ............................................. C08L 53/00
[52] U.S. Cl. ..................................... 524/505; 525/92; 525/905
[58] Field of Search ........................... 525/92; 524/505

[56] References Cited

U.S. PATENT DOCUMENTS

| | | | |
|---|---|---|---|
| 3,257,358 | 6/1966 | Stamatoff | 260/47 |
| 3,257,367 | 6/1966 | Stamatoff | 260/47 |
| 3,281,383 | 10/1966 | Zelinski et al. | 260/23.7 |
| 3,306,874 | 2/1967 | Hay | 260/47 |
| 3,306,875 | 2/1967 | Hay | 260/47 |
| 3,382,212 | 5/1968 | Price et al. | 260/47 |
| 3,383,435 | 5/1968 | Cizek et al. | 260/874 |
| 3,442,885 | 5/1969 | Dormagen et al. | 260/47 |
| 3,455,880 | 7/1969 | Kobayashi et al. | 260/47 |
| 3,573,257 | 3/1971 | Nakashio et al. | 260/47 |
| 3,639,508 | 2/1972 | Kambour | 260/876 B |
| 3,660,531 | 5/1972 | Lauchlan et al. | 260/876 B |
| 3,767,730 | 10/1973 | Nakashio et al. | 260/880 R |
| 3,835,200 | 9/1974 | Lee, Jr. | 260/876 R |
| 3,859,250 | 1/1975 | Fodor | 260/45.85 A |
| 3,887,646 | 6/1975 | Yonemitsu et al. | 260/876 R |
| 3,887,647 | 6/1975 | Yonemitsu et al. | 260/876 B |
| 3,920,770 | 11/1975 | Nakashio et al. | 260/897 R |
| 3,963,804 | 6/1976 | Yonemitsu et al. | 260/873 |
| 3,983,090 | 9/1976 | Abolins et al. | 260/42.18 |
| 3,994,856 | 1/1976 | Katchman et al. | 260/42.47 |

OTHER PUBLICATIONS

New Contact Cements based on Radial Block Butadiene/Styrene Copolymers by L. Marrs & L. O. Edmonds, Dec. 1971, p. 1520.

Rubber World 1973, Compounding Radial Block Polymers by J. R. Haws & T. C. Middlebrook, p. 27–30 & 32 & 48.

Primary Examiner—Paul Lieberman
Attorney, Agent, or Firm—Hedman, Casella, Gibson & Costigan

[57] ABSTRACT

Thermoplastic compositions moldable to articles of high impact strength are provided which comprise an intimate admixture of a polyphenylene ether resin, a styrene resin, and a radial teleblock copolymer comprising a vinyl aromatic compound, a conjugated diene, and a coupling agent.

13 Claims, No Drawings

IMPACT RESISTANT POLYPHENYLENE ETHER RESIN COMPOSITIONS CONTAINING RADIAL TELEBLOCK COPOLYMERS

This is a continuation of application Ser. No. 21,951 filed Mar. 19, 1979, now abandoned, which is a cont. of Ser. No. 794,255, filed May 5, 1977, now abandoned, which is a cont. of Ser. No. 671,344, filed Mar. 29, 1976, now abandoned.

This invention relates to thermoplastic molding compositions of a polyphenylene ether resin, a styrene resin and a radial teleblock copolymer of a vinyl aromatic compound and a conjugated diene. The compositions of this invention provide molded articles having good mechanical properties, including improved impact resistance.

BACKGROUND OF THE INVENTION

Polyphenylene ether resins comprise a class of thermoplastics which are characterized by outstanding physical properties, including hydrolytic stability, excellent dielectic properties, broad temperature use range and dimensional stability at elevated temperatures. They can be made by a variety of catalytic and non-catalytic processes from the corresponding phenols or reactive derivatives thereof. In general, they are prepared by the oxidative coupling of a phenolic compound with a complex copper catalyst. By way of illustration, descriptions of the preparation of polyphenylene ether resins are contained in Hay, U.S. Pat. No. 3,306,874 and 3,306,875, and in Stamatoff, U.S. Pat. No. 3,257,357 and 3,257,358, which are incorporated herein by reference.

In the Hay patents, the polyphenylene ether resins are prepared by oxidative coupling comprising passing an oxygen-containing gas through a reaction solution of a phenol and a metal-amine complex catalyst. In the Stamtoff patents, the polyphenylene ethers are prepared by reacting the corresponding phenolate ion with an initiator, e.g., an acid peroxide, in the presence of a complexing agent.

Disclosures relating to the preparation of polyphenylene ether resins using metal catalysts which do not include amines are found in Wieden et al, U.S. Pat. No 3,442,885 (copperamidines), Nakashio et al, U.S. Pat. No. 3,573,257 (metal-alcoholates or metal phenolates), and Kobayashi et al, U.S. Pat. No. 3,455,880 (cobalt chelates). The preparation of polyphenylene ethers by a non-catalytic process, e.g., oxidation with lead dioxide, silver oxide, and the like, is described in Price et al, U.S. Pat. No. 3,382,212. The disclosures of all of these references are incorporated herein by reference, to save unnecessary detail.

The processing of polyphenylene ether resins on injection molding and extrusion equipment is enhanced when the polyphenylene ethers are combined with styrene resins, e.g., crystal homopolystyrene or rubber-modified high-impact polystyrenes. These polymers are combinable in a wide range of proportions, e.g., from 1 to 99 parts of polyphenylene ether and from 99 to 1 parts of styrene resin. Compositions comprising from 10 to 60 parts of polyphenylene ether and 90 to 40 parts of styrene resin offer an especially wide range of desirable design properties. Such combinations are disclosed in Cizek, U.S. Pat. No. 3,383,435, which is incorporated herein by reference. The thermoplastic compositions disclosed in Cizek can include a rubber-modified high-impact styrene resin, as well as a homopolystyrene. High-impact styrene resins are especially useful in providing polyphenylene ether compositions which possess good resistance to impact.

It has now been surprisingly discovered that when compositions of a polyphenylene ether resin and a styrene resin are blended with a radial teleblock copolymer of a vinyl aromatic compound and a conjugated diene, e.g., a styrene-butadiene radial teleblock copolymer, the resulting compositions provide molded articles of greater impact strength. The radial teleblock copolymers of the present invention have been found to be compatible with, and effective for, compositions of relatively high polyphenylene ether resin content, e.g., 50 parts by weight or more, and low molecular weight crystal polystyrene, as well as compositions of relatively low polyphenylene ether resin content, e.g., 35 parts by weight or less, and high-impact polystyrene.

As used herein, the term "radial teleblock copolymer" refers to branched polymers having segments, or blocks, which are comprised of a conjugated diene polymer, blocks of a vinyl aromatic polymer, and a coupling agent. More particularly, in the copolymer structure, several chains of the diene polymer, usually three or more, extend from a coupling agent, with each chain terminating at its other end with a block of the vinyl aromatic polymer. It is generally believed that incompatibility of the block segments in the radial teleblock copolymer promotes the formation of a two-phase system with blocks of the vinyl aromatic polymer coalescing to form discrete regions, or "domains". These domains simulate the effect of cross-links between the chains of elastomer, and a branched elastomeric network is thus formed comprising blocks of a conjugated diene polymer, blocks of vinyl aromatic polymer, and a coupling agent.

Radial teleblock copolymers are known in the art. For instance, detailed descriptions of these materials are given by Marrs et al in ADHESIVES AGE, December, 1971 pp. 15-20 and by Haws et al in RUBBER WORLD, January, 1973, pp. 27-32, the disclosures of which are incorporated by reference.

SUMMARY OF THE INVENTION

According to the present invention, there are provided thermoplastic molding compositions which comprise an intimate admixture of:
 (i) a polyphenylene ether resin;
 (ii) a styrene resin; and
 (iii) a radial teleblock copolymer of a vinyl aromatic compound, a conjugated diene and a coupling agent.

Within the invention broadly described above, the styrene resin component (ii) can be either homopolystyrene or a rubber-modified high-impact polystyrene. The radial teleblock copolymer (iii) is preferably a branched copolymer of styrene and butadiene containing a relatively small, effective amount of a coupling agent selected from among epoxidized-polybutadiene (e.g., Oxiron 2000 or Oxiron 2001), SiCl$_4$ or mixtures thereof.

DETAILED DESCRIPTION OF THE INVENTION

The polyphenylene ether resin (i) is preferably one of a family having repeating units represented by the formula:

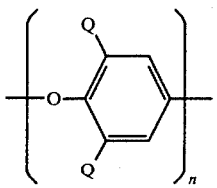

(I)

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and the phenol nucleus.

Examples of polyphenylene ethers corresponding to the above formula can be found in the above-referenced patents of Hay and Stamatoff.

For purposes of the present invention an especially preferred family of polyphenylene ether includes those having alkyl substitution in the two positions ortho to the oxygen ether atom, i.e., those of the above formula wherein each Q is alkyl, most preferably having from 1 to 4 carbon atoms. Illustrative members of this class are: poly(2,6-dimethyl-1,4-phenylene)ether; poly(2,6-diethyl-1,4-phenylene)ether; poly(2-methyl-6-ethyl-1,4-phenylene)ether; poly(2-methyl-6-propyl-1,4-phenylene)ether; poly(2,6-dipropyl-1,4-phenylene)ether; poly(2-ethyl-6-propyl-1,4-phenylene)ether; and the like. The most preferred polyphenylene ether resin is poly(2,6-dimethyl-1,4-phenylene)ether, preferably having an intrinsic viscosity of about 0.5 deciliters per gram as measured in chloroform at 30° C.

The preferred styrene resins (ii) will be those having at least 25% by weight of repeating units derived from a vinyl aromatic compound of the formula:

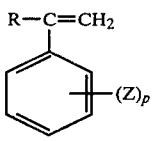

(II)

wherein R is hydrogen, (lower) alkyl or halogen; Z is vinyl, halogen or (lower) alkyl; and p is 0 or an integer of from 1 to the number of replaceable hydrogen atoms on the benzene nucleus. Herein, the term "lower) alkyl" is intended to mean alkyl of from 1 to 6 carbon atoms.

Merely by way of illustration, such styrene resins will include homopolymers such as polystyrene and monochloropolystyrene, the modified polystyrenes, such as rubber-modified, high-impact polystyrene and the styrene containing copolymers, such as the styrene-acrylonitrile copolymers, styrene-butadiene copolymers, styrene-acrylonitrile-α-alkyl styrene copolymers, styrene-acrylonitrile-butadiene copolymers, poly-α-methyl-styrene, copolymers of ethylvinylbenzene, and divinylbenzene, styrene-maleic anhydride copolymers, styrene-butadiene-styrene block copolymers and styrene-butadiene block copolymers, and styrene-butadiene-styrene maleic anhydride block copolymers.

Especially preferred styrene resins are homopolystyrene and rubber-modified high-impact polystyrene resins, i.e., those which have been modified by natural or synthetic polymeric materials which are elastomers at room temperature, e.g., 20° to 25° C., such as polystyrene resins containing polybutadiene or rubbery styrene-butadiene copolymers.

A preferred high impact polystyrene is FG 834, available from Foster-Grant Co., which is a rubber-modified high-impact polystyrene containing about 8% polybutadiene rubber. A preferred low molecular weight homopolystyrene is KPTL-5, commercially available from Sinclair-Koppers Co., having a number average molecular weight of about 40,000. A preferred homopolystyrene of relatively high molecular weight is DYL8G, with a number average molecular weight of about 150,000, also available from Sinclair-Koppers.

The radial teleblock copolymers (iii) are available commercially or can be prepared by following the teachings of the prior art. As an illustration, they can be made by polymerizing conjugated dienes, e.g., butadiene, and vinyl aromatic compounds, e.g., styrene in the presence of an organometallic initiator, e.g., n-butyllithium, to produce copolymers which contain an active metal atom, such as lithium, on one end of each of the polymer chains. These metal atom-terminated polymers are then reacted with a coupling agent which has at least three active sites capable of reacting with the carbon-metal atom bonds on the polymer chains and replacing the metal atoms on the chains. This results in polymers which have relatively long branches which radiate from a nucleus formed by the polyfunctional coupling agent.

Such a method of preparation is described in detail in Zelinski et al, U.S. Pat. No. 3,281,383, which is incorporated herein by reference.

The coupling agents for the radial teleblock copolymers can be chosen from among polyepoxides, polyisocyanates, polyimines, polyaldehydes, polyketones, polyanhydrides, polyesters, polyhalides and the like. These materials can contain two or more types of functional groups, such as the combination of epoxy and aldehyde groups or isocyanate and halide groups. The coupling agents are described in detail in the above-mentioned U.S. Pat. No. 3,281,383.

The conjugated dienes of the radial teleblock copolymer include compounds such as 1,3-butadiene, isoprene, 2,3-dimethyl-1,3-butadiene, 1,3-pentadiene, 3-butyl-1,3-octadiene, and the like. The vinyl aromatic polymers may be prepared from vinyl aromatic compounds of Formula II. They include styrene, 1-vinylnaphthalene, 2-vinylnaphthalene and the alkyl, cycloalkyl, aryl, alkaryl and aralkyl derivatives thereof. Examples include 3-methylstyrene, 4-n-propylstyrene, 4-cyclohexylstyrene, 4-dodecylstyrene, 2-ethyl-4-benzylstyrene, 4-p-tolylstyrene, 4-(4-phenyl-n-butyl) styrene, and the like.

In preferred compositions, the radial teleblock copolymer will be a radial teleblock copolymer of styrene and butadiene, with terminal blocks derived from styrene, and a coupling agent selected from epoxidized polybutadiene, SiCl$_4$ or mixtures thereof. Especially preferred epoxidized polybutadiene and coupling agents are available commercially under the trade names Oxiron 2000 and Oxiron 2001.

The molecular weight of the radial teleblock copolymer and the ratios of the co-monomers thereof can vary broadly. In preferred embodiments the molecular weight of the radial teleblock copolymer will be from about 100,000 to about 350,000, and will comprise from 1 to 45 parts by weight of the vinyl aromatic compound and from 99 to 55 parts by weight of the conjugated diene, based on the weight of the radial teleblock copolymer. The amount of coupling agent in the copolymer will depend on the particular agent and the amount of organometallic initiator used. Generally, relatively small amounts of coupling agent, e.g., from about 0.1 to 1 part by weight per 100 parts of resin are employed.

Preferred radial teleblock copolymers are Solprene 406 (containing about 60 parts by weight of butadiene units and about 40 parts by weight of styrene units), Solprene 411 (containing about 70 parts by weight of butadiene units and about 30 parts by weight of styrene units), Solprene 414 (containing about 60 parts by weight of butadiene units and about 40 parts by weight of styrene units), Solprene 417 (containing about 20 parts by weight of butadiene units and about 80 parts by weight of styrene units), and S411P (containing about 70 parts by weight of butadiene units and about 30 parts by weight of styrene units). These materials also include a relatively minor amount of coupling agent, e.g., less than 1 part by weight of coupling agent per 100 parts of polymer.

Components (i), (ii) and (iii) are combinable in a fairly wide range of proportions. Preferably, the compositions of this invention will comprise from about 10 to about 65 parts by weight of polyphenylene ether resin (i), from about 90 to about 35 parts by weight of styrene resin (ii), and from about 1 to about 25 parts by weight of radial teleblock copolymer (iii), based on the total weight of the composition.

The compositions of the invention can also include other ingredients, such as flame retardants, extenders, processing aids, pigments, stabilizers and the like, for their conventionally employed purposes. Reinforcing fillers, in amounts sufficient to impart reinforcement, can be used, such as aluminum, iron or nickel, and the like, and non-metals, such as carbon filaments, silicates, such as acicular calcium silicate, asbestos, titanium dioxide, potassium titanate and titanate whiskers, glass flakes and fibers.

The preferred reinforcing fillers are of glass. In general, best properties will be obtained if glass filaments are employed in amounts of from about 10 to about 40% by weight, based on the combined weight of glass and resin. However, higher amounts can be used.

The compositions of this invention can be prepared by blending the components to form a premix, passing the latter through an extruder at an elevated temperature, e.g., 425° to 640° F., cooling and chopping the extrudate into pellets, and molding them into the desired shape.

DESCRIPTION OF THE PREFERRED EMBODIMENTS

The following examples illustrate the compositions of the invention. They are set forth merely as a further illustration and are not to be construed as limiting the invention in any manner.

EXAMPLES 1-4

Blends of 50 parts by weight of poly(2,6-dimethyl-1,4-phenylene)ether resin, having an intrinsic viscosity of about 0.5 deciliters per gram as measured in chloroform at 30° C., 35 parts by weight of a low molecular weight homopolystyrene (KPTL-5, Sinclair-Koppers Co.) 15 parts by weight of a radial teleblock styrene-butadiene copolymer (Solprene resins, Phillips Petroleum, See Table 1), 1.5 parts by weight of polyethylene processing aid, and 0.5 parts by weight of tridecylphosphite, were prepared by blending the components in a Henschel mixer.

The blends contained Solprene 406, Solprene 411, and Solprene 414, respectively. The blends were compounded on a twin-screw 28 mm Werner-Pfleiderer extruder at a temperature of about 570° F. Thereafter the extrudate was chopped into pellets and molded into test bars on a Newbury injection molding machine.

For purposes of comparison, a blend was made of 50 parts by weight of poly(2,6-dimethyl-1,4-phenylene)ether resin 25 parts by weight of a low molecular weight homopolystyrene (KPTL-5, Sinclair-Koppers Co.), 25 parts by weight of a rubber-modified high-impact polystyrene (FG 834, Foster-Grant), 1.5 parts by weight of polyethylene and 0.5 parts by weight of tridecylphosphite were prepared as above.

Test bars of the compositions were evaluated for physical properties according to ASTM procedures. Heat Deflection Temperature was measured using 2½ inch×½ inch×⅛ inch test bars under 264 psi fiber stress, Izod Impact Strength using 2½ inch×½ inch×⅛ inch test bars, Gardner Impact Strength using 3¾ inch×2½ inch×⅛ inch test bars, Tensile properties (Elongation, Tensile Strength at Yield, Tensile Strength at Break) using 2½ inch×⅛ inch L-type tensile bars, and Flexural properties (Flexural Strength at yield and Flexural Modulus) using 2½ inch×½ inch×⅛ inch test bars.

The results are reported in Table 1.

TABLE 1

| Properties | Composition | | | |
| --- | --- | --- | --- | --- |
| | 1[a] | 2[b] | 3[c] | 4* |
| Heat Deflection (°F.) | 268 | 270 | 268 | 270 |
| Izod Impact (ft.lbs./in.n.) | 2.6 | 2.9 | 3.1 | 1.8 |
| Gardner Impact (in.lbs.) | 138 | 132 | 183 | 90 |
| Tensile Elongation (%) | 57 | 58 | 67 | 85 |
| Tensile Yield (psi × $10^{-2}$) | 101 | 94 | 100 | 109 |
| Tensile Break (psi × $10^{-2}$) | 87 | 79 | 84 | 91 |
| Flexural Yield (psi × $10^{-2}$) | 151 | 142 | 148 | 165 |
| Flexural Modulus (psi × $10^{-3}$) | 351 | 336 | 356 | 403 |

[a]Solprene 406, average mol. wt. about 200,000–300,000
[b]Solprene 411, average mol. wt. about 300,000
[c]Solprene 414, average mol. wt. about 150,000
*comparison It is demonstrated from the above that the compositions of Examples 1–3, which are in accordance with the invention, possess superior impact resistance, as measured by the Gardner and Izod impact tests, when compared with the composition of Example 4.

EXAMPLES 5-8

Blends of 25 parts by weight of poly(2,6-dimethyl-1,4-phenylene) ether resin, having an intrinsic viscosity of about 0.5 deciliters per gram as measured in chloroform at 30° C., 65 parts by weight of rubber-modified high-impact polystyrene (FG 834, Foster-Grant Co.), 10 parts of styrene-butadiene radial teleblock copolymer (Solprene resins, see Table), 1.5 parts of polyethylene, 0.5 parts of tridecylphosphite, 3.0 parts of titanium dioxide, and 0.05 parts of carbon black were prepared by the method described in Examples 1–4.

As a comparison, a blend of 25 parts of poly(2,6-dimethyl-1,4-phenylene) ether resin, I.V. about 0.5 in CHCl$_3$ at 30° C., 75 parts by weight of high-impact polystyrene (FG 834), 1.5 parts by weight of polyethylene, 0.5 parts by weight of tridecylphosphite, 3.0 parts by weight of titanium dioxide and 0.05 parts by weight of carbon black was prepared as above.

The compositions were tested as above, and the results are reported in Table 2.

TABLE 2

| Properties | Composition | | | |
|---|---|---|---|---|
| | 5$^a$ | 6$^b$ | 7$^c$ | 8* |
| Heat Deflection (°F.) | 227 | 224 | 225 | 223 |
| Izod Imp. (ft.lbs./in.n.) | 3.9 | 3.3 | 3.6 | 2.5 |
| Gardner Imp. (in.lbs. at 73° F.) | 147 | 140 | 159 | 78 |
| Sub-zero Gardner Impact (in.lbs. at −40° F.) | 107 | 78 | 39 | 11 |
| Tensile Elongation (%) | 56 | 60 | 50 | 49 |
| Tensile Yield (psi × 10$^{-2}$) | 67 | 65 | 66 | 70 |
| Tensile Break (psi × 10$^{-2}$) | 70 | 70 | 70 | 69 |
| Flexural Yield (psi × 10$^{-2}$) | 87 | 85 | 87 | 86 |
| Flexural Modulus (psi × 10$^{-3}$) | 300 | 291 | 291 | 330 |

$^{a, b}$ and $^c$ are as designated above in Table 1.
*comparison

EXAMPLES 9–10

The following compositions were prepared using the procedure described in Examples 1–4. All parts are by weight.

| Components | 9 | 10 |
|---|---|---|
| Poly(2,6-dimethyl-1,4-phenylene) ether | 35 | 35 |
| S411P radial teleblock copolymer | — | 10 |
| DYL 8G high molecular weight homopolystyrene | — | 55 |
| FG 834 rubber-modified high-impact polystyrene | 65 | — |
| Triphenylphosphate | 7 | 7 |
| Polyethylene | 1.5 | 1.5 |
| Tridecylphosphite | 0.5 | 0.5 |
| Zinc sulfate | 0.15 | 0.15 |
| Zinc oxide | 0.15 | 0.15 |
| Pigment | 11.5 | 11.5 |

The compositions were tested according to ASTM procedures. Test specimen geometries were identical to those described in Examples 1–4. The test results were as follows:

TABLE 3

| Properties | 9 | 10 |
|---|---|---|
| Heat Deflection (°F.) | 203 | 207 |
| Izod Impact (ft.lbs./in.n.) | 3.8 | 4.8 |
| Gardner Impact (in.lbs.) | 180 | 160 |
| Tensile Elongation (%) | 67 | 39 |
| Tensile Yield (psi × 10$^{-2}$) | 67 | 87 |
| Tensile Break (psi × 10$^{-2}$) | 67 | 71 |
| Flexural Yield (psi × 10$^{-2}$) | 91.7 | 122.2 |
| Flexural Modulus (psi × 10$^{-3}$) | 353 | 381 |

It is shown in Examples 9–10 that a radial teleblock copolymer is effective in improving the Izod impact strength of a polyphenylene ether resin-high molecular weight homopolystyrene composition. Improvements in tensile strength and flexural properties are also obtained.

Obviously, other modifications and variations of the present invention are possible in the light of the above teachings. It is therefore, to be understood that changes may be made in the particular embodiments described above which are within the full intended scope of the invention as defined in the appended claims.

We claim:
1. A thermoplastic molding composition which comprises an intimate admixture of:
   (i) from about 10 to about 65 percent by weight of a polyphenylene ether resin;
   (ii) from about 90 to about 35 percent weight of a styrene resin, and
   (iii) from about 5 to about 25 percent by weight of a radial teleblock copolymer comprising a vinyl aromatic compound, a conjugated diene, and a coupling agent.

2. A composition as defined in claim 1 wherein the polyphenylene ether resin (i) has repeating units of the structural formula:

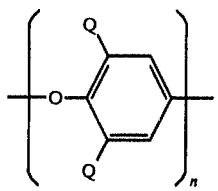

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and the phenol nucleus; and wherein, in said styrene resin (ii), at least 25% by weight of repeating units of the styrene resin (ii) are derived from a vinyl aromatic compound of the formula:

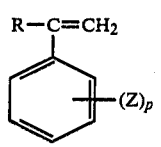

wherein R is hydrogen, (lower) alkyl or halogen; Z is vinyl, halogen or (lower) alkyl; and p is 0 or an integer of from 1 to the number of replaceable hydrogen atoms in the benzene nucleus.

3. A composition as defined in claim 2 wherein, in said polyphenylene ether resin (i), each Q is methyl and in said styrene resin (ii), R is hydrogen and p is 0.

4. A composition as defined in claim 3 wherein said styrene resin (ii) is a low molecular weight homopolystyrene.

5. A composition as defined in claim 3 wherein said styrene resin (ii) is a rubber-modified high-impact polystyrene.

6. A composition as defined in claim 1 wherein said radial teleblock copolymer (iii) comprises from 1 to 45 parts by weight of the vinyl aromatic compound and from 99 to 55 parts by weight of the conjugated diene and a relatively small amount of a coupling agent, based on the weight of the radial teleblock copolymer.

7. A composition as defined in claim 6 wherein, in said radial teleblock copolymer (iii), the coupling agent is a polymer selected from the group consisting of polyepoxides, polyisocyanates, polyimines, polyaldehydes, polyketones, polyanhydrides, polyesters, and polyhalides.

8. A composition as defined in claim 1 wherein, in said radial teleblock copolymer (iii), the vinyl aromatic compound is styrene, the conjugated diene is butadiene, and the coupling agent is selected from the group consisting of epoxidized polybutadiene, $SiCl_4$ and mixtures thereof.

9. A composition as defined in claim 1 which further comprises a reinforcing amount of a reinforcing filler.

10. A thermoplastic molding composition which comprises an intimate admixture of:
   (i) from about 10 to about 65 percent by weight of poly(2,6-dimethyl-1,4-phenylene) ether;
   (ii) from about 90 to about 35 percent by weight of polystyrene, and
   (iii) from about 5 to about 25 percent by weight of a radial teleblock copolymer of styrene, butadiene and an epoxidized polybutadiene coupling agent.

11. A composition as defined in claim 10 wherein said polystyrene (ii) is homopolystyrene.

12. A composition as defined in claim 10 wherein said polystyrene (ii) is a rubber-modified high-impact polystyrene.

13. A composition as defined in claim 10 which further comprises a glass reinforcing filler in an amount of from about 10 to about 40%, based on the combined weight of glass and resin.

* * * * *